United States Patent
Baumann

(10) Patent No.: US 6,536,472 B2
(45) Date of Patent: Mar. 25, 2003

(54) HIGH PERFORMANCE FLUID CONTROL VALVE

(75) Inventor: Hans D. Baumann, Rye, NH (US)

(73) Assignee: Fisher Controls International, Inc., Marshalltown, IA (US)

( * ) Notice: Subject to any disclaimer, the term of this patent is extended or adjusted under 35 U.S.C. 154(b) by 0 days.

(21) Appl. No.: 09/850,313

(22) Filed: May 7, 2001

(65) Prior Publication Data

US 2002/0162591 A1 Nov. 7, 2002

(51) Int. Cl.⁷ ................................................ F16K 3/24
(52) U.S. Cl. ..................... 137/625.3; 251/121
(58) Field of Search .................. 137/625.3, 625.33; 251/121

(56) References Cited

U.S. PATENT DOCUMENTS

| | | | |
|---|---|---|---|
| 3,135,286 A | | 6/1964 | Baumann |
| 3,219,310 A | | 11/1965 | Baumann |
| 3,304,949 A | | 2/1967 | Baumann |
| 3,776,278 A | | 12/1973 | Allen |
| 3,857,542 A | * | 12/1974 | Heymann ............... 251/120 |
| 3,908,698 A | | 9/1975 | Baumann |
| 4,018,245 A | | 4/1977 | Baumann |
| 4,041,973 A | | 8/1977 | Rice et al. |
| 4,108,210 A | | 8/1978 | Luthe et al. |
| 4,149,563 A | * | 4/1979 | Seger ................... 137/625.33 |
| 4,705,071 A | * | 11/1987 | Connors, Jr. et al. .... 137/625.3 |
| 5,018,703 A | * | 5/1991 | Goode .................... 251/127 |
| 5,113,908 A | * | 5/1992 | Steinke ................ 137/625.3 |
| 5,180,139 A | | 1/1993 | Gethmann et al. |
| 5,193,583 A | | 3/1993 | Gethmann et al. |
| 5,332,004 A | | 7/1994 | Gethmann et al. |
| 5,400,825 A | | 3/1995 | Gethmann et al. |
| 5,769,122 A | | 6/1998 | Baumann et al. |
| 6,026,859 A | | 2/2000 | Wears et al. |
| 6,095,196 A | | 8/2000 | McCarty et al. |

FOREIGN PATENT DOCUMENTS

EP 0 432 873 A2 6/1991

* cited by examiner

*Primary Examiner*—John Fox
(74) *Attorney, Agent, or Firm*—Wolf, Greenfield & Sacks, P.C.

(57) ABSTRACT

A fluid control valve includes a valve body having a fluid passageway, a cage mounted in the fluid passageway and a valve plug assembly including a valve plug. The cage has a cage bore and defines one or more windows, a valve seat located below the windows and a flow control portion of the cage bore located between the valve seat and the windows. The flow control portion has an interior contour that varies in dimension as a function of distance from the valve seat. The flow control portion provides precise control in low flow conditions. The cage may further define a sealing lip located above the windows. The valve plug assembly may include a deformable sealing ring for engaging the sealing lip when the valve plug is in a closed position. The deformable sealing ring permits valve plug travel that is substantially free of sliding seal friction.

13 Claims, 8 Drawing Sheets

HIGH PERFORMANCE FLUID CONTROL VALVE

FIELD OF THE INVENTION

This invention relates generally to fluid control valves and, more particularly, to fluid control valve structures which provide highly controllable flow characteristics and which limit sliding seal friction during valve plug travel.

BACKGROUND OF THE INVENTION

One type of prior art fluid control valve includes a valve body having inlet and outlet ports, a sleeve-like cage, a valve plug that is slidable within the cage and a bonnet assembly which retains the cage and the valve plug in the valve body. The inlet port communicates with the outlet port through apertures, or windows, in the cage. Fluid flow through the valve is determined by the position of the valve plug relative to the windows in the cage. An example of a prior art fluid control valve is disclosed in U.S. Pat. No. 3,776,278 issued Dec. 4, 1973 to Allen.

Prior art fluid control valves have provided satisfactory performance but have certain drawbacks. The flow characteristics may be difficult to control, particularly near the off position of the valve plug. In addition, the valve may generate undesirable noise under certain flow conditions. Furthermore, the seating surface of the valve plug may be subject to erosive wear over time, thereby degrading valve operation. Frictional forces encountered in changing the position of the valve plug may cause control systems to be unstable. Component tolerances and thermal expansion may produce an unsatisfactory fit between valve parts and may degrade performance. Conventional gate valves are limited in fluid flow capacity for a given orifice diameter.

Accordingly, there is a need for fluid control valve structures which overcome one or more of the above drawbacks.

SUMMARY OF THE INVENTION

According to a first aspect of the invention, a fluid control valve is provided. The fluid control valve comprises a valve body having a fluid passageway, a cage mounted in the fluid passageway, and a valve plug assembly including a valve plug. The cage includes a cage bore having an axis. The cage defines one or more windows, a valve seat located below the windows and a sealing lip located above the windows. The valve plug is axially slidable in the cage bore. The valve plug has one or more pressure balancing passages between opposite ends thereof and a seating surface for engaging the valve seat. The valve plug assembly further comprises an elastically deformable sealing ring for engaging the sealing lip when the valve plug is in a closed position.

The deformable sealing ring may comprise an elastic metal. Preferably, the delormable sealing ring contacts the cage only in the closed position and near the closed position. The cage bore may have a larger diameter above the sealing lip than below the sealing lip. The valve plug assembly may further comprise an elastomer ring located below the deformable sealing ring.

According to another aspect of the invention, a fluid control valve is provided. The fluid control valve comprises a valve body having a fluid passageway, a cage mounted in the fluid passageway, and a valve plug assembly including a valve plug. The cage includes a cage bore having an axis. The cage defines one or more windows, a valve seat located below the windows and a flow control portion of the cage bore located between the valve seat and the windows. The flow control portion has an interior contour that varies in dimension as a function of distance from the valve seat. The valve plug is axially slidable in the cage bore between a closed position in engagement with the valve seat, a partially open position wherein fluid flow is determined by a spacing between the valve plug and the flow control portion of the cage bore, and a more open position wherein fluid flow is determined by the windows and by the spacing between the valve plug and the flow control portion.

In a first embodiment, the interior contour of the flow control portion has a diameter that is an exponential function of distance from the valve seat. In a second embodiment, the interior contour of the flow control portion has a diameter that is a linear function of distance from the valve seat. The interior contour of the flow control portion may be selected to provide a desired flow characteristic.

The valve plug may include a cylindrical section that defines a spacing between the valve plug and the flow control portion of the cage bore, and an annular expansion groove above the cylindrical section. The annular expansion groove may have a surface that slopes away from the cylindrical section at an angle of at least 30° with respect to the cage bore axis.

The valve plug may include a seating surface for engaging the valve seat and an extension below the seating surface. The extension may be shaped to provide initial throttling of the fluid, deflecting fluid flow away from the seating surface and thereby limiting erosive wear caused by high fluid velocity and entrained particles. The valve plug may further include a streamlined, curved contour below the extension for guiding the fluid smoothly into the windows when the valve is at or near the open position. This is further aided by streamlined entrance portions of the cage windows.

The valve plug may include one or more pressures balancing passages between opposite ends thereof The cage bore may include a sealing lip located above the windows, and the valve plug assembly may include an elastically deformable sealing ring for engaging the sealing lip in the closed position.

The cage may be constructed to be axially deformable. The axially deformable cage compensates for machining tolerances and thermal expansion.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
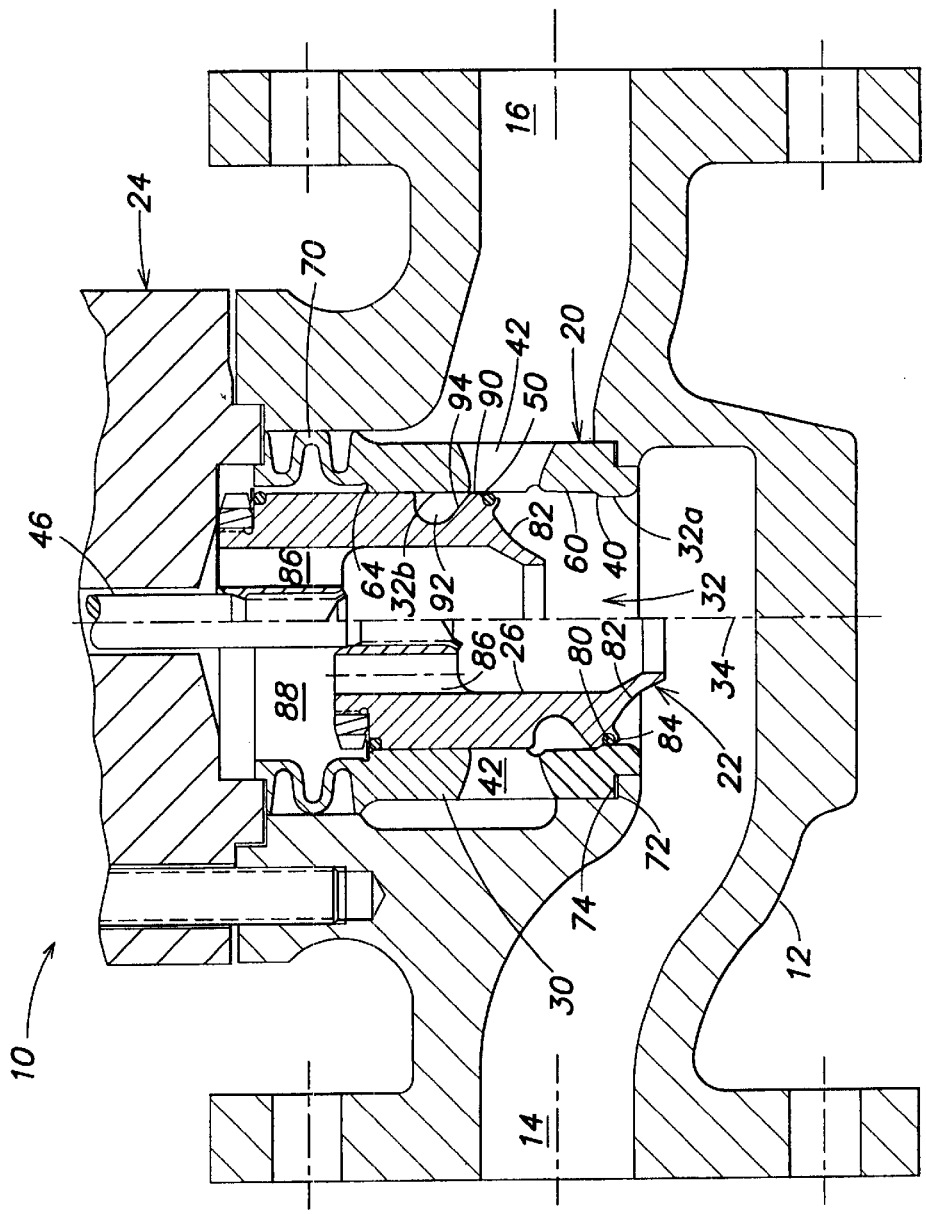
FIG. 1 is a cross-sectional view of a fluid control valve in accordance with a first embodiment of the invention, with the valve plug split along its axis, such that the left half of the valve plug is shown in the closed position and the right half of the valve plug is shown in the open position.
Figure 8:
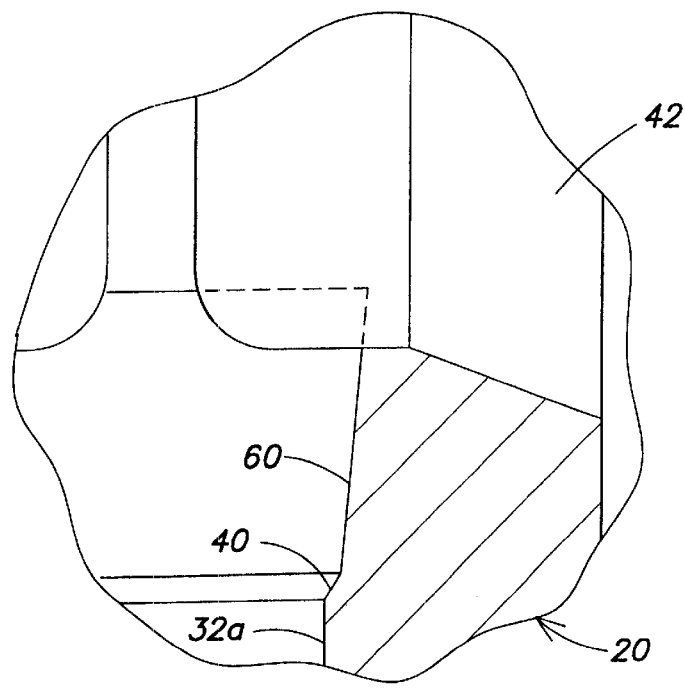
FIG. 8 is an enlarged, partial cross-sectional view of the flow control portion and seating surface of the cage of FIG. 6.
Figure 9:
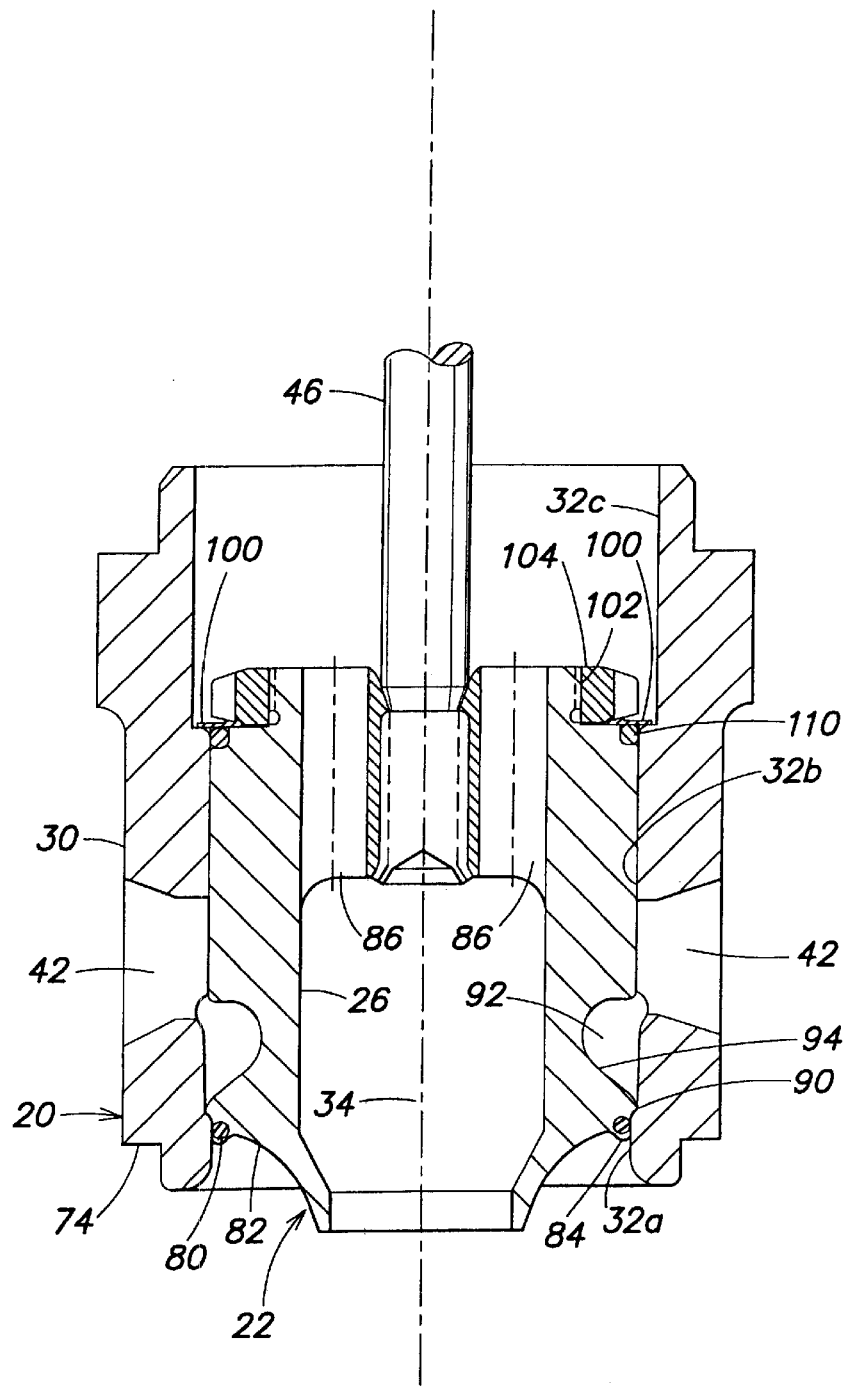
FIG. 9 is a cross-sectional view of a cage and a valve plug assembly in accordance with a third embodiment of the invention, shown in the closed position.
Figure 10:
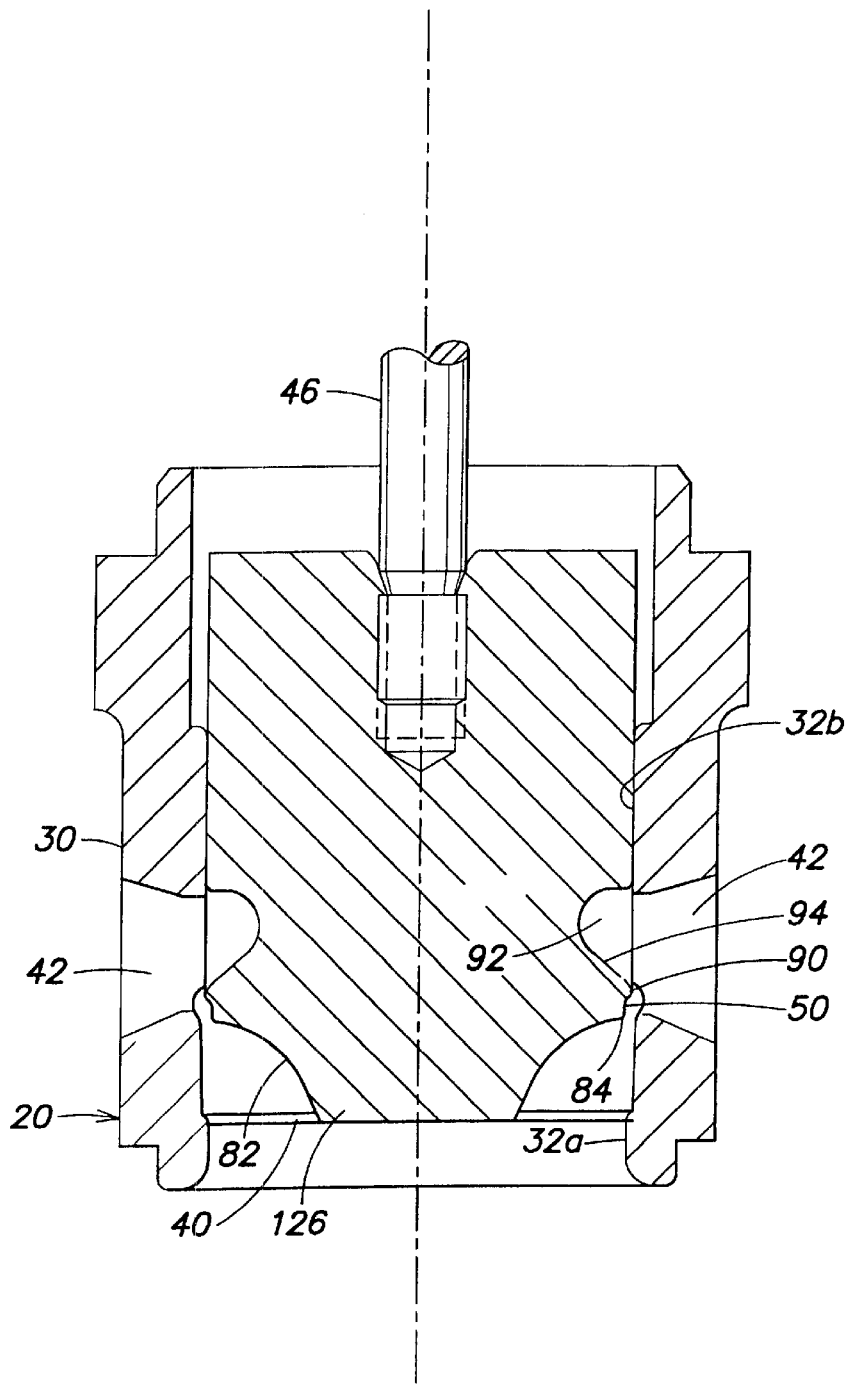
FIG. 10 is a cross-sectional view of a cage and a valve plug assembly in accordance with a fourth embodiment of the invention, shown in a partially open position.

A fluid control valve in accordance with a first embodiment of the invention is shown in FIG. 1. A cage and a valve plug assembly in accordance with a second embodiment of the invention are shown in FIGS. 2–8. A cage and a valve plug assembly in accordance with a third embodiment of the invention are shown in FIG. 9. A cage and a valve plug assembly in accordance with a fourth embodiment of the invention are shown in FIG. 10. The cage and the valve plug assemblies shown in FIGS. 2–10 may be utilized in a fluid control valve of the type shown in FIG. 1. Corresponding elements in FIGS. 1–10 have the same reference numerals. The differences between the embodiments are noted below.

A control valve 10, as shown in FIG. 1, includes a valve body 12 having an inlet port 14 and an outlet port 16, a cage 20, a valve plug assembly 22 and a bonnet assembly 24. A major component of valve plug assembly 22 is a valve plug 26.

In the embodiment of FIGS. 2–8, cage 20 does not include a deformable section. In addition, the valve plug assembly 22 does not include an elastomer ring below the seating surface. In other respects, the embodiment of FIGS. 2–8 is similar to the embodiment of FIG. 1. In the embodiment of FIG. 9, the cage 20 does not include a deformable section. In other respects, the embodiment of FIG. 9 is similar to the embodiment of FIG. 1. Accordingly, the embodiments of FIGS. 1–9 may be described together, subject to the differences noted above.

The cage 20 is a sleeve-like structure having a generally cylindrical wall 30 and a cage bore 32 having an axis 34. Cage bore 32 has a lower section 32a with a first diameter, a middle section 32b with a second diameter that is larger than the first diameter and an upper section 32c with a third diameter that is larger than the first and second diameters. In addition, cage bore 32 has a flow control portion 60 of variable diameter, as discussed below. Cage 20 defines a valve seat 40 and one or more apertures, or windows 42. Windows 42 provide flow passages between cage bore 32 and the exterior of cage 20.

A valve stem 44 attached to valve plug 26 extends through bonnet assembly 24 to an actuator (not shown). The valve plug assembly 22 is slidable along axis 34 within the middle section 32b of cage bore 32 between an open position, shown on the right of axis 34 in FIG. 1, an intermediate or partially open position (shown in FIG. 3), and a closed position, shown on the left of axis 34 in FIG. 1. In the closed position, a seating surface 50 of valve plug 26 engages valve seat 40, thereby blocking fluid flow through the control valve. In the open position, valve plug assembly 22 is moved along axis 34 to a position above windows 42 in cage 20. In the open position, the inlet port 14 communicates with the outlet port 16 through cage bore 32 and windows 42, aided by contour 82 on valve plug 26. The valve plug assembly 22 may be positioned at any intermediate position between the open and closed positions to achieve a desired flow. The structure of the cage 20 and the valve plug assembly 22 determine the flow characteristic as a function of valve plug position as described below.

Figure 6:
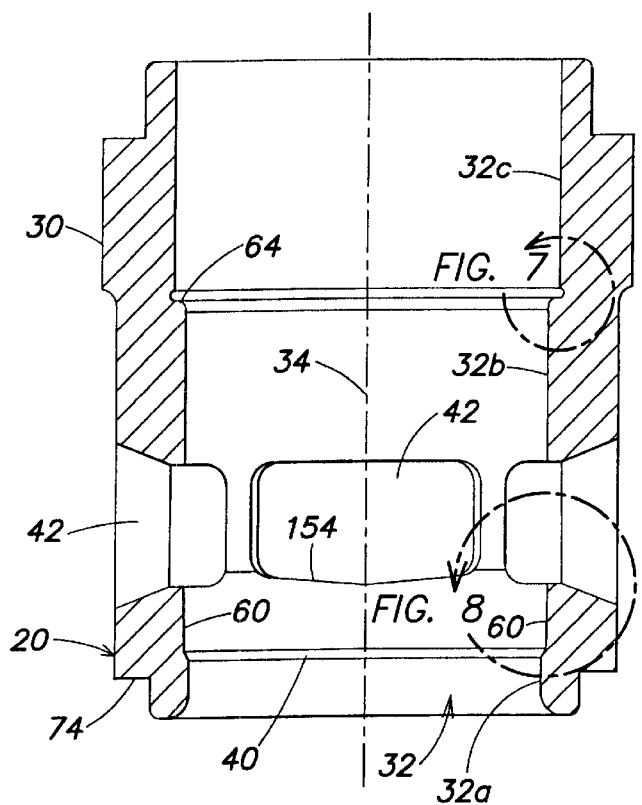
FIG. 6 is a cross-sectional side view of the cage of FIG. 2.
Figure 7:
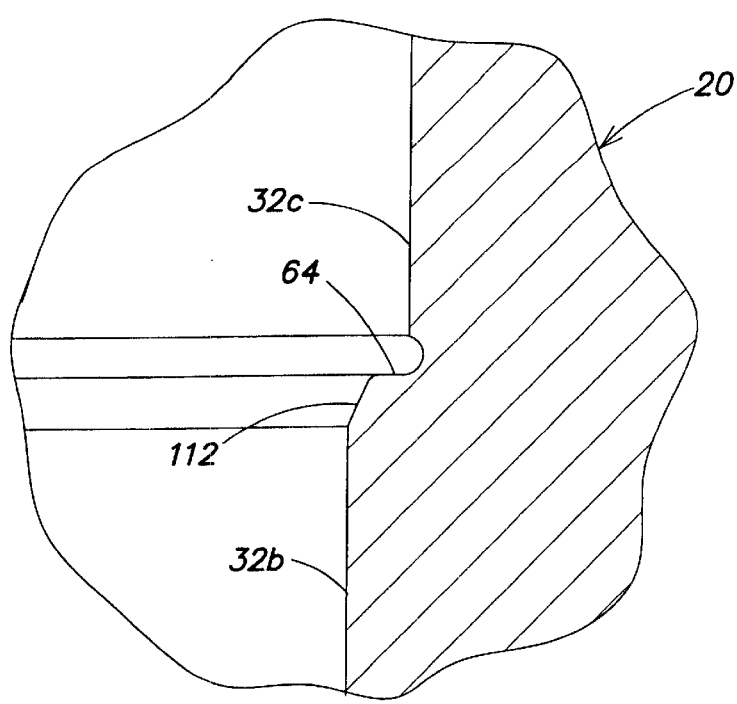
FIG. 7 is an enlarged, partial cross-sectional view of the sealing lip of the cage of FIG. 6.

As illustrated, valve seat 40 is located below windows 42 in cage 20 and is spaced from windows 42. As best shown in FIGS. 6 and 8, flow control portion 60 of cage bore 32 has an interior contour that is selected to provide a desired flow characteristic in low flow conditions. In particular, flow control portion 60 has a diameter that varies from smaller near valve seat 40 to larger near windows 42. The flow control portion 60 may include all or a part of the cage bore 32 between valve seat 40 and windows 42. In one embodiment, flow control portion 60 has a diameter that is an exponential function of distance from valve seat 40. In another embodiment, the flow control portion 60 has a diameter that is a linear function of distance from valve seat 40. In each case, the diameter increases with increasing distance from valve seat 40. The effect of flow control portion 60 is a gradually increasing gap between a cylindrical section 90 (FIG. 3) of valve plug 26 and cage 20 as valve plug 26 is moved upwardly along axis 34. This configuration permits precise control under low flow conditions in contrast to a rapid increase or decrease in flow when valve plug 26 moves past the lower edge of windows 42. The shape of flow control portion 60 may be selected to provide a desired flow characteristic. In one embodiment, the diameter of flow control portion 60 varies from 100.5% to 105% of the diameter of middle section 32b of cage bore 32.

Figure 2:
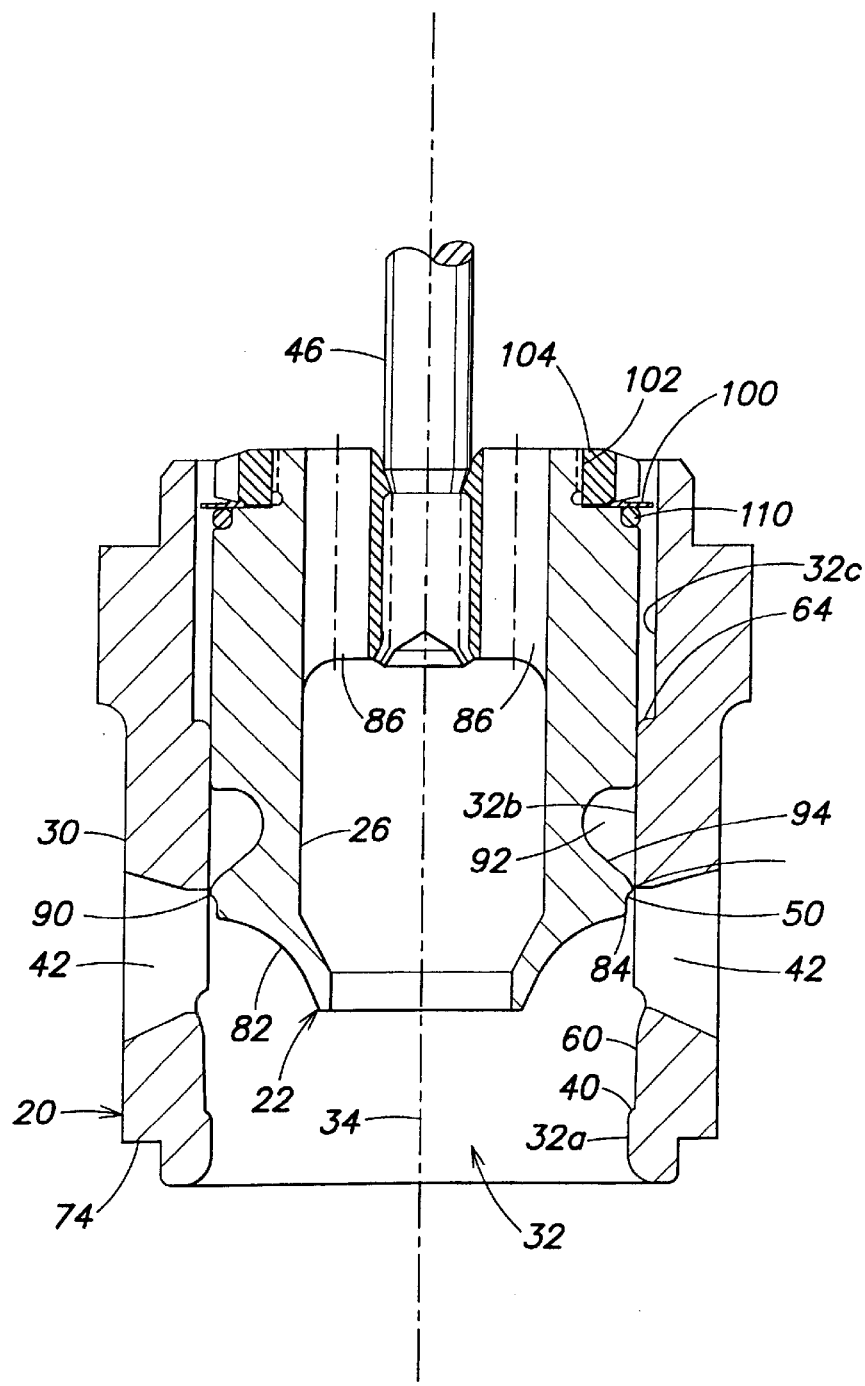
FIG. 2 is a cross-sectional view of a cage and a valve plug assembly in accordance with a second embodiment of the invention shown in the open position.
Figure 3:
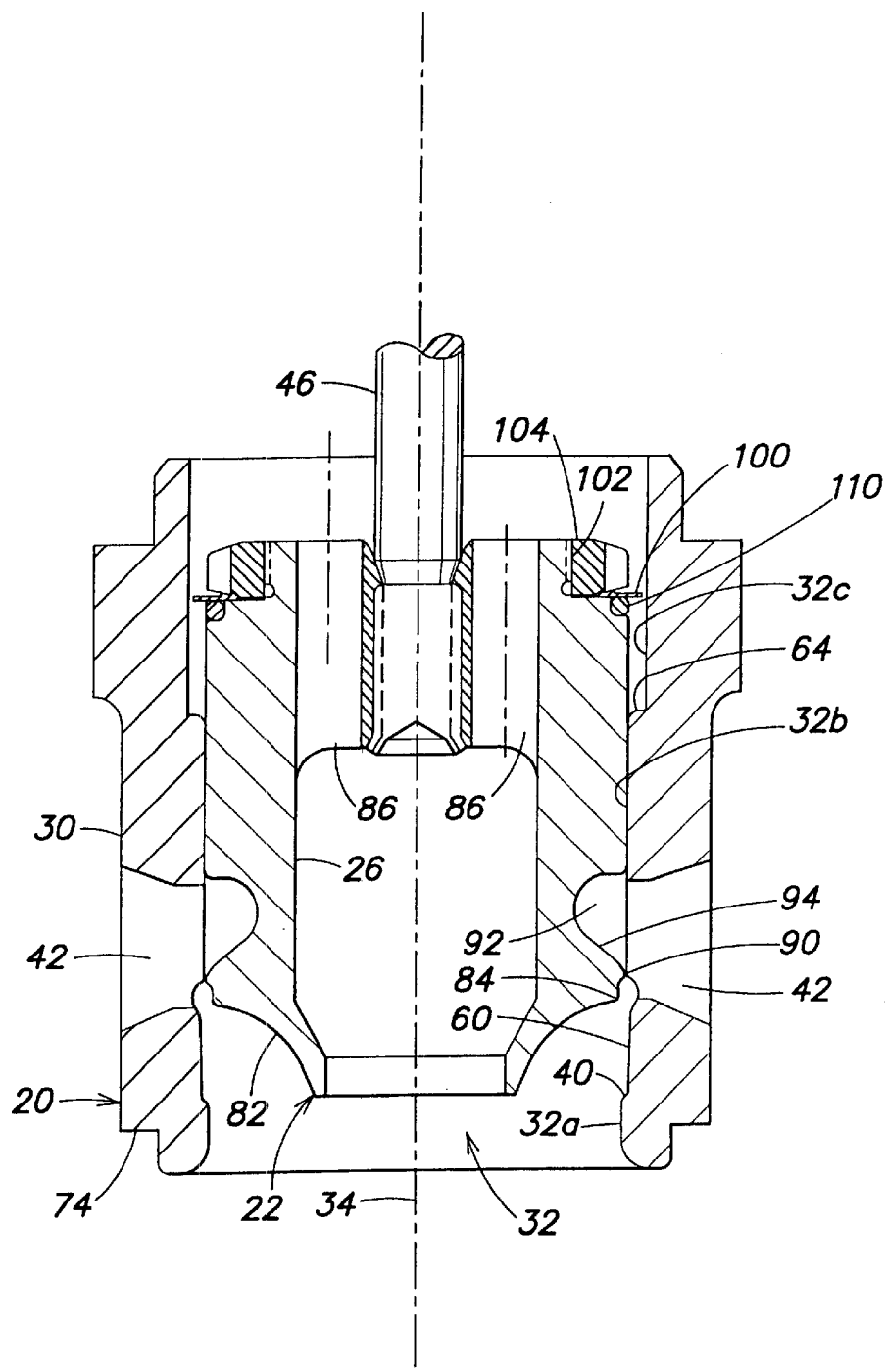
FIG. 3 is a cross-sectional view of the cage and valve plug assembly of FIG. 2, shown in a partially open position.
Figure 4:
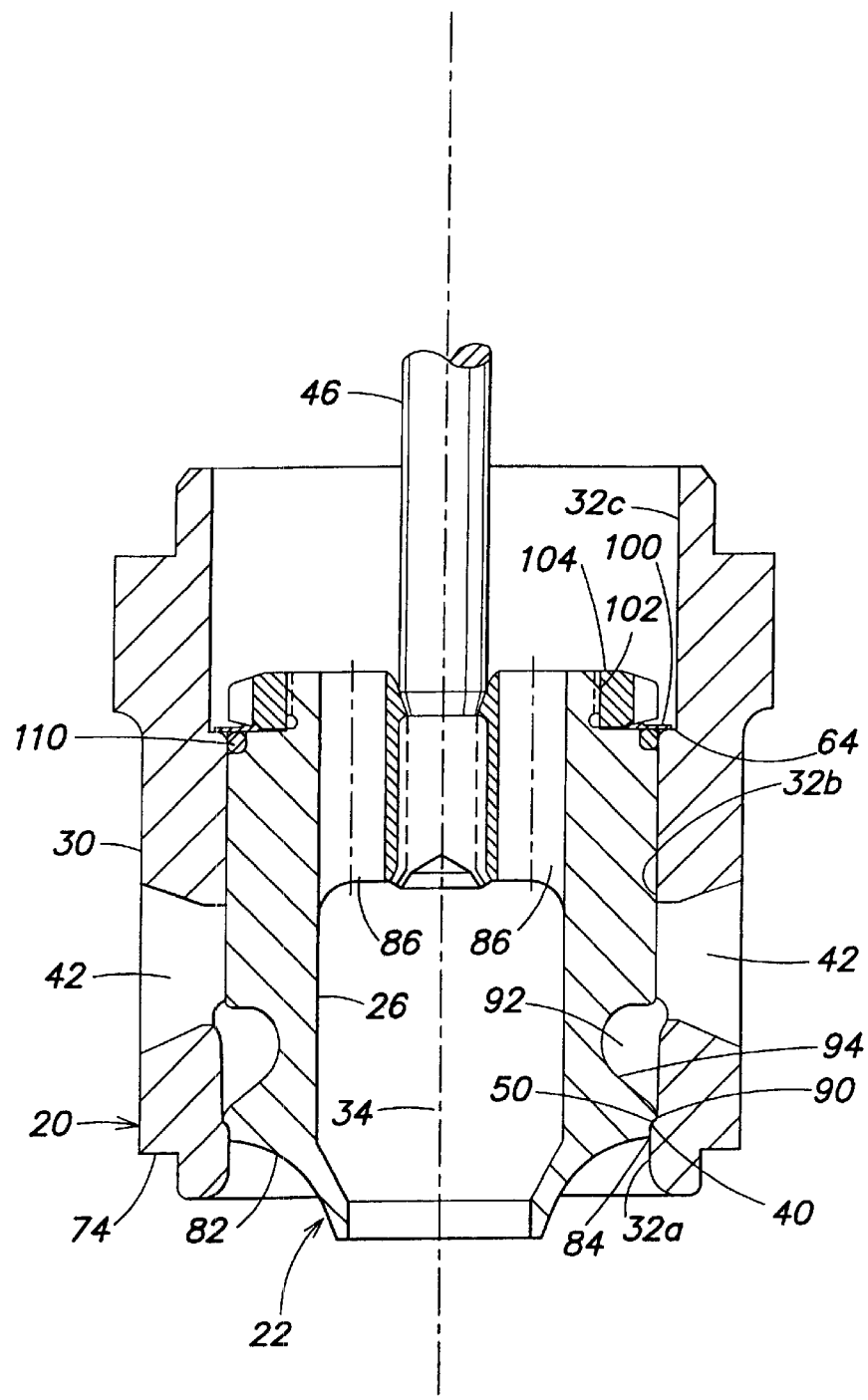
FIG. 4 is a cross-sectional view of the cage and valve plug assembly of FIG. 2, shown in the closed position.
Figure 5:
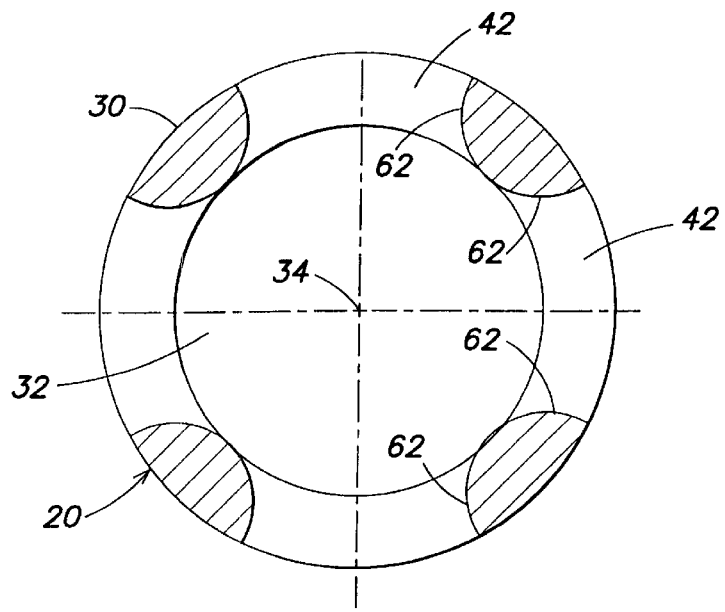
FIG. 5 is a cross-sectional top view of the cage of FIG. 2.

When valve plug 26 is at or near the open position shown for example in FIG. 2, the flow characteristic is determined primarily by windows 42 in cage 20. Windows 42 preferably are flared outwardly as shown in FIGS. 1–4. The gradually expanding windows minimize turbulence near the open position and therefore maximize flow capacity. This is further aided by guiding the fluid into the window with contour 82 of valve plug 26. The entrance portions of the windows 42 may be curved, as shown at 62 in FIG. 5, to provide smooth fluid flow.

Windows 42 furthermore may have a gradually opening V-shaped lower edge 154, as shown in FIG. 6, to aid the flow transition from flow control portion 60 to window 42. In an alternative configuration, window 42 may have a straight lower edge. In general, the lower edges of windows 42 may be shaped to provide a desired flow characteristic.

Cage 20 may include a sealing lip 64 located above windows 42. Sealing lip 64 is defined by a change in diameter of cage bore 32. In particular, cage bore 32 has a diameter in a middle section 32b between windows 42 and sealing lip 64 that is slightly larger than the maximum diameter of valve plug 26. Above sealing lip 64, upper section 32c of cage bore 32 has a larger diameter, sufficient to provide clearance for a deformable sealing ring on valve plug assembly 22, as described below.

Cage 20 may include an axially deformable section 70 (FIG. 1). The axially deformable section 70 compensates for machining tolerances and thermal expansion of cage 20 relative to valve body 12. As a result, machining tolerances may be relaxed. By way of example, the axially deformable section 70 may be implemented by providing a wall section of cage 20 that is thinned and folded, similar to a bellows.

Valve body 12 is provided with a shoulder 72 that engages a corresponding shoulder 74 on cage 20. Cage 20 is retained within valve body 12 by bonnet assembly 24. When bonnet assembly 24 is installed on valve body 12, cage 20 is axially deformed by the opposing forces exerted by shoulder 72 and bonnet assembly 24.

As noted above, valve plug 26 is provided with seating surface 50 for engaging valve seat 40 in the closed position of valve plug 22. Seating surface 50 and valve seat 40 may have matching angles of about 30° to ensure a fluid-tight seal. In addition, valve plug 26 may be provided with a groove for receiving an elastomer ring 80 located below seating surface 50. Elastomer ring 80 engages lower section 32a of cage bore 32 below valve seat 40 and provides further sealing. Valve plug 26 preferably includes an extension 84 below seating Surface 50 that is shaped to throttle fluid flow between itself and the lower section 32a of cage bore 32. This results in a two step throttling process at low lift, where valve plug 26 is near the closed position. The first step is between extension 84 of valve plug 26 and lower section 32a of cage bore 32. The second step is between cylindrical section 90 of valve plug 26 and flow control portion 60 of cage bore 32. This two step process shifts the throttling away from seating surface 50. Lower contour 82 of valve plug 26 may have a concave, curved shape that is symmetrical about axis 34 to guide fluid flow into windows 42 in the open or nearly open position of valve plug 26.

Valve plug 26 is further provided with one or more pressure balancing passages 86 between upper and lower ends thereof. A fluid within the valve moves through passages 86 to a region 88 above valve plug 26, thereby balancing the pressure on opposite ends of valve plug 26 and aiding in the deflection of sealing ring 100 against sealing lip 64.

Valve plug 26 includes short cylindrical section 90 above seating surface 50, followed by an annular expansion groove 92. Cylindrical section 90 has a diameter that is slightly smaller than the diameter of cage bore 32 in middle section 32b. A surface 94 of expansion groove 92 slopes away from cylindrical section 90 at an angle of at least 30° and preferably about 45° with respect to cage bore axis 34. The configuration of cylindrical section 90 followed by expansion groove 92 permits rapid jet expansion, maximum turbulence and low pressure recovery for reduced noise in low flow conditions.

Valve plug assembly 22 further includes an elastically deformable sealing ring 100 held on a shoulder 102 at the upper end of valve plug 26 by a threaded retainer 104. Sealing ring 100, which may be a metal such as a high nickel alloy, is selected for high tensile strength at high temperatures. Sealing ring 100 has an outside diameter that is larger than the maximum diameter of valve plug 26 but is smaller than the inside diameter of upper section 32c of cage bore 32 above sealing lip 64. As a result, sealing ring 100 does not contact cage 20, except at sealing lip 64. The valve plug, 26 may be provided with a groove for an elastomer ring 110 located below sealing ring 100. Elastomer ring 110 may be utilized in applications involving temperatures below about 450° F. Elastomer ring 110 also has an outside diameter that is less than the inside diameter of upper section 32c of cage bore 32 above sealing lip 64.

In operation, valve plug assembly 22 moves axially within cage bore 32 without seal friction until valve plug 22 is near the closed position. Before seating surface 50 engages valve seat 40, sealing ring 100 engages sealing lip 64 of cage 20 and is slightly deformed as valve plug assembly 22 moves to the fully closed position. In addition, elastomer ring 110 engages a beveled portion 112 (FIG. 7) of sealing lip 64 and is slightly deformed. Thus, sealing ring 100 and elastomer ring 110 provide a reliable seal between the region 88 above valve plug 22 and windows 42 when valve plug assembly 22 is in the closed position. In the open and partially-open positions of valve plug assembly 22, sealing ring 100 and elastomer ring 110 do not contact cage 20, and movement of valve plug 26 is substantially free of sliding seal friction.

A fourth embodiment of the valve plug is shown in FIG. 10. Like elements in FIGS. 1–10 have the same reference numerals. A valve plug 126 is similar to valve plug 26 described above, except that the valve plug 126 does not include balancing passages or elastomer rings and does not include a deformable sealing ring at the upper end of valve plug 126. The valve plug 126 relies for sealing on contact between seating surface 50 and valve seat 40. Also, the cage 20 shown in FIG. 10 is not axially deformable. The embodiment of FIG. 10, with no elastomer rings, may be used in applications involving temperatures above about 450° F.

The valve structures have been described above in connection with the valve orientation of FIG. 1. Thus, valve seat 40 is described as located "below" windows 42. and sealing lip 64 is described as located "above" windows 42. It will be understood that the control valve may have any desired orientation in use and that the relative positions of the valve elements will change. In addition, it will be understood that the valve features described herein may be utilized separately or in any combination to achieve high performance valve operation.

It should be understood that various changes and modifications of the embodiments shown in the drawings described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A fluid control valve comprising:

a valve body having a fluid passageway;

a cage mounted in said fluid passageway, said cage including a generally cylindrical wall, a cage bore having an axis, said cage defining one or more windows, a valve seat located below said one or more windows and a flow control portion of the cage bore located between said valve seat and said windows, the flow control portion having an interior contour that varies in dimension as a function of distance from said valve seat; and a valve plug assembly including a valve plug that is axially slidable in the cage bore and is guided by said cage between a closed position in engagement with said valve seat, a partially open position wherein fluid flow is determined by a spacing between said valve plug and the flow control portion of the cage bore, and a more open position wherein fluid flow is determined by said windows and by said spacing, wherein said valve plug comprises a cylindrical section that defines a spacing between said valve plug and the flow control portion of the cage bore, and an annular expansion groove above said cylindrical section configured to facilitate low pressure recovery for reduced noise in low flow applications.

2. A fluid control valve as defined in claim 1 wherein the interior contour of the flow control portion has a diameter that is an exponential function of distance from said valve seat.

3. A fluid control valve as defined in claim 1 wherein the interior contour of the flow control portion has a diameter that is a lineal function of distance from said valve seat.

4. A fluid control valve as defined in claim 1 wherein said annular expansion groove is in part defined by a surface that slopes away from said cylindrical section at an angle of at least 30° with respect to the cage bore axis.

5. A fluid control valve as defined in claim 1 wherein said cage is axially deformable.

6. A fluid control valve as defined in claim 1 wherein said valve plug includes a seating surface for engaging said valve seat and an extension below the seating surface, wherein the extension is shaped to deflect fluid flow away from the seating surface and to guide fluid flow into said windows near an open position of said valve plug.

7. A fluid control valve as defined in claim 1 wherein said valve plug includes a seating surface for engaging said valve seat and wherein said valve plug assembly further comprises an elastomer ring mounted in said valve plug adjacent to the seating surface.

8. A fluid control valve as defined in claim 1 wherein said valve plug includes one or more pressure balancing passages between opposite ends thereof.

9. A fluid control valve as defined in claim 1 wherein the cage bore includes a sealing lip located above said one or more windows and wherein said valve plug assembly includes a deformable sealing ring for engaging the sealing lip in the closed position.

10. A fluid control valve as defined in claim 1 wherein said one or more windows are flared outwardly.

11. A fluid control valve as defined in claim 1 wherein said windows have entrance portions that are curved to provide smooth fluid flow.

12. A fluid control valve as defined in claim 1 wherein said one or more windows have lower edges that are shaped to provide a desired flow characteristic.

13. A fluid control valve as defined in claim 1 wherein said one or more windows have V-shaped lower edges.

* * * * *